United States Patent
Yang et al.

(10) Patent No.: US 11,466,135 B2
(45) Date of Patent: Oct. 11, 2022

(54) POLYESTER FILM, PREPARATION METHOD THEREOF AND METHOD FOR REPRODUCING POLYETHYLENETEREPHTHALATE CONTAINER USING SAME

(71) Applicants: SKC CO., LTD., Gyeonggi-do (KR); SKC INC., Covington, GA (US)

(72) Inventors: Joo Ho Yang, Gyeonggi-do (KR); Chul Kyu Kim, Gyeonggi-do (KR); Yong Deuk Kim, Gyeonggi-do (KR)

(73) Assignees: SKC CO., LTD., Gyeonggi-do (KR); SKC INC., Covington, GA (US)

( * ) Notice: Subject to any disclaimer, the term of this patent is extended or adjusted under 35 U.S.C. 154(b) by 0 days.

(21) Appl. No.: 17/306,615

(22) Filed: May 3, 2021

(65) Prior Publication Data

US 2022/0235187 A1    Jul. 28, 2022

(30) Foreign Application Priority Data

Jan. 22, 2021  (KR) .................. 10-2021-0009734
Jan. 22, 2021  (KR) .................. 10-2021-0009735

(51) Int. Cl.
| | | |
|---|---|---|
| *C08J 5/18* | (2006.01) | |
| *B29B 9/04* | (2006.01) | |
| *B29B 9/16* | (2006.01) | |
| *B29C 55/00* | (2006.01) | |
| *C08G 63/183* | (2006.01) | |
| *B29K 67/00* | (2006.01) | |

(52) U.S. Cl.
CPC ............... *C08J 5/18* (2013.01); *B29B 9/04* (2013.01); *B29B 9/16* (2013.01); *B29C 55/005* (2013.01); *C08G 63/183* (2013.01); *B29K 2067/003* (2013.01); *C08J 2367/03* (2013.01)

(58) Field of Classification Search
USPC .... 428/411.1, 412, 34.1, 34.9, 35.7; 521/48; 528/190, 193, 194, 271, 272, 274
See application file for complete search history.

(56) References Cited

U.S. PATENT DOCUMENTS

| | | |
|---|---|---|
| 2019/0211167 A1 | 7/2019 | Peters et al. |
| 2021/0122897 A1 | 4/2021 | Kim et al. |
| 2021/0122899 A1 | 4/2021 | Kim et al. |
| 2022/0002477 A1* | 1/2022 | Kim ..................... C08G 63/183 |
| 2022/0098377 A1* | 3/2022 | Kim ........................ B29B 17/04 |

FOREIGN PATENT DOCUMENTS

| | | |
|---|---|---|
| CA | 2663336 A1 | 10/2009 |
| EP | 3868813 A1 | 8/2021 |
| JP | H9-052337 A | 2/1997 |
| JP | 2003-326658 A | 11/2003 |
| KR | 2002-0062838 A | 7/2002 |
| KR | 10-2005-0117240 A | 12/2005 |
| KR | 10-2008-0056470 A | 6/2008 |
| KR | 10-2019-0125956 A | 11/2019 |
| WO | 2019/167815 A1 | 9/2019 |
| WO | 2019212241 A1 | 11/2019 |
| WO | 2020076747 A1 | 4/2020 |

OTHER PUBLICATIONS

Office Action issued by the Korean Patent Office dated Jun. 7, 2021.
Extended European Search Report issued by the European Patent Office dated Nov. 11, 2021.
Examination report issued by the Australian Patent Office dated Feb. 2, 2022.
Office Action for application No. 3,116,849 issued by the Canadian Patent Office dated Jun. 10, 2022.

* cited by examiner

*Primary Examiner* — Terressa Boykin
(74) *Attorney, Agent, or Firm* — IP & T Group LLP

(57) ABSTRACT

The embodiments relate to a polyester film, to a process for preparing the same, and to a process for regenerating a polyethylene terephthalate (PET) container using the same. The polyester film has excellent seaming characteristics and recyclability by virtue of controlled crystallinity, whereby clumping rarely occurs even if it is thermally treated for a long period of time in the regeneration process.

7 Claims, 4 Drawing Sheets

[Fig. 1]
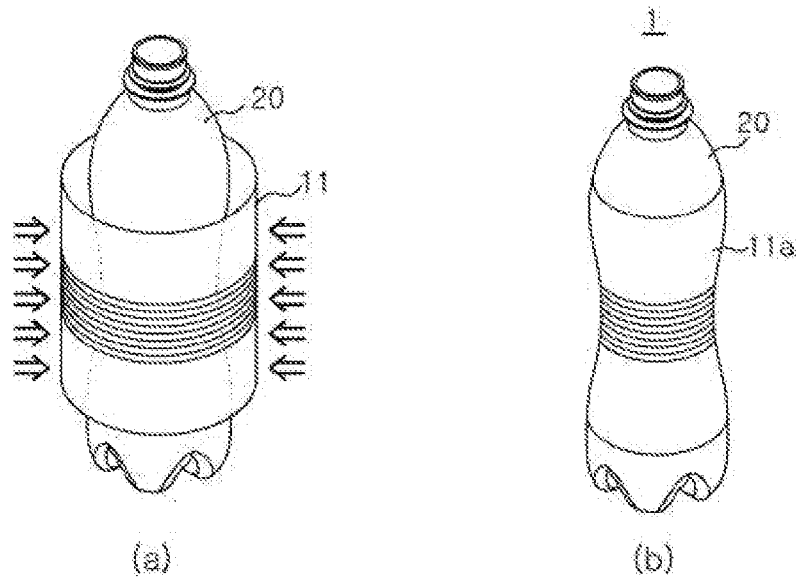

[Fig. 2]
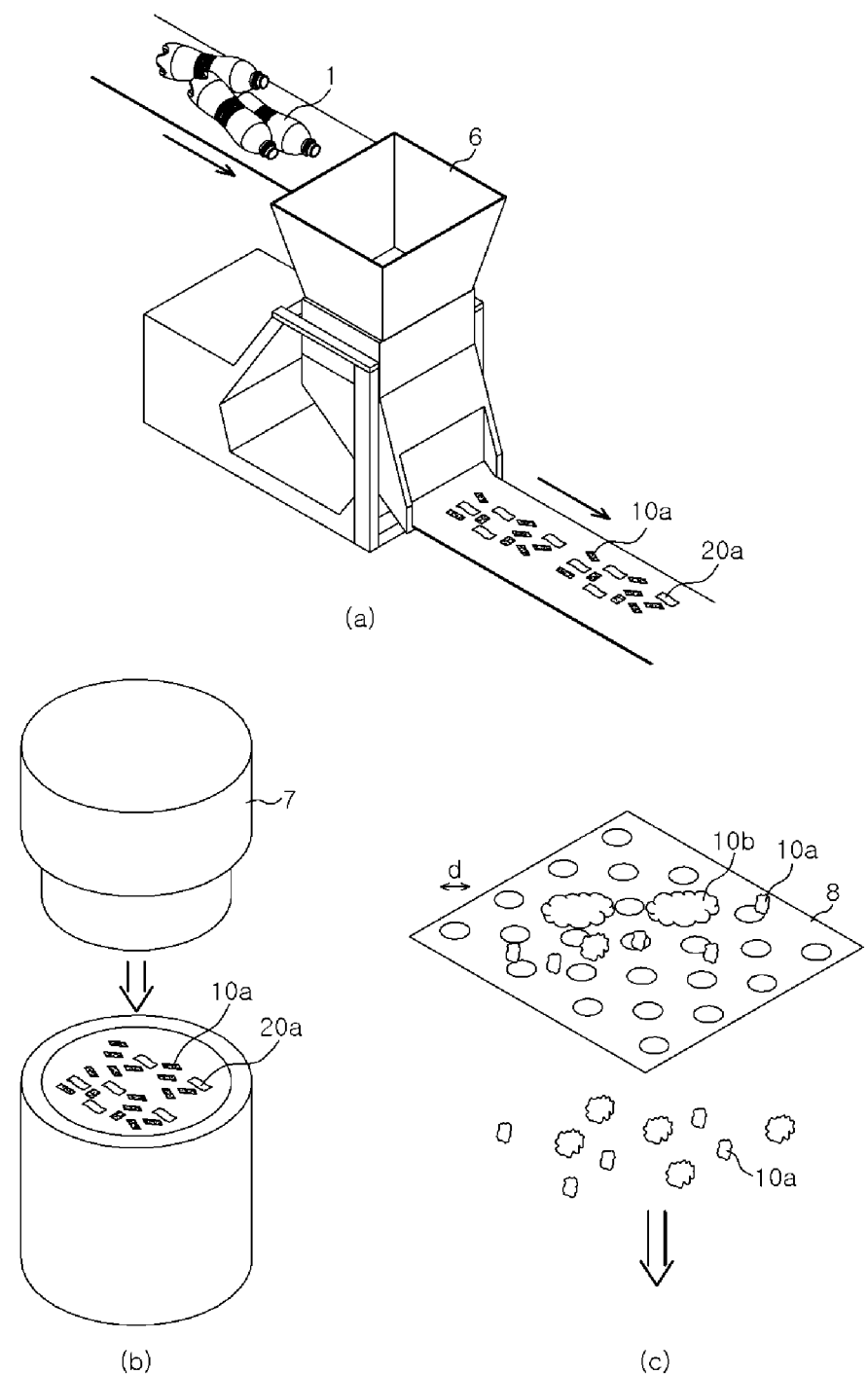

[Fig. 3]
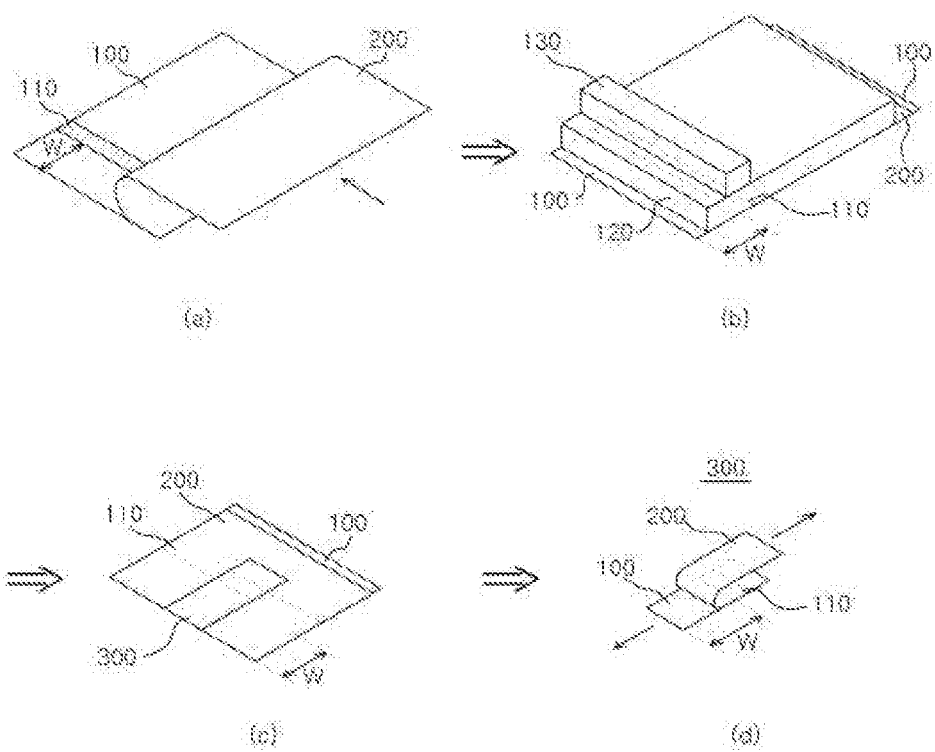
[Fig. 4]
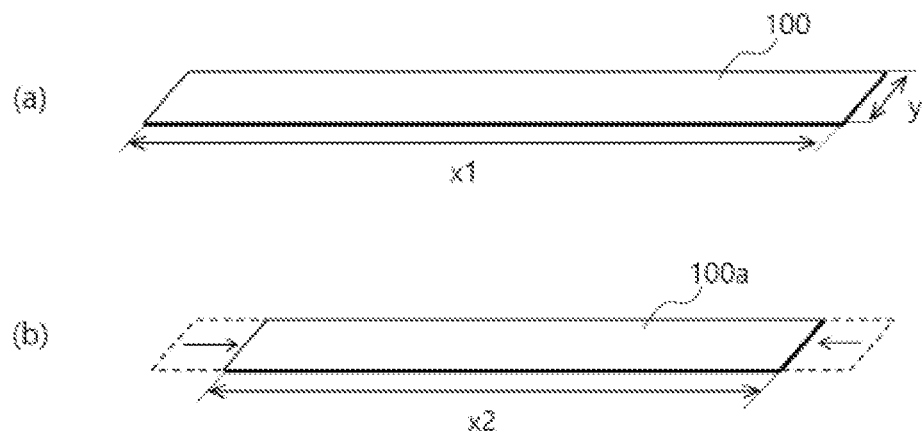

[Fig. 5]
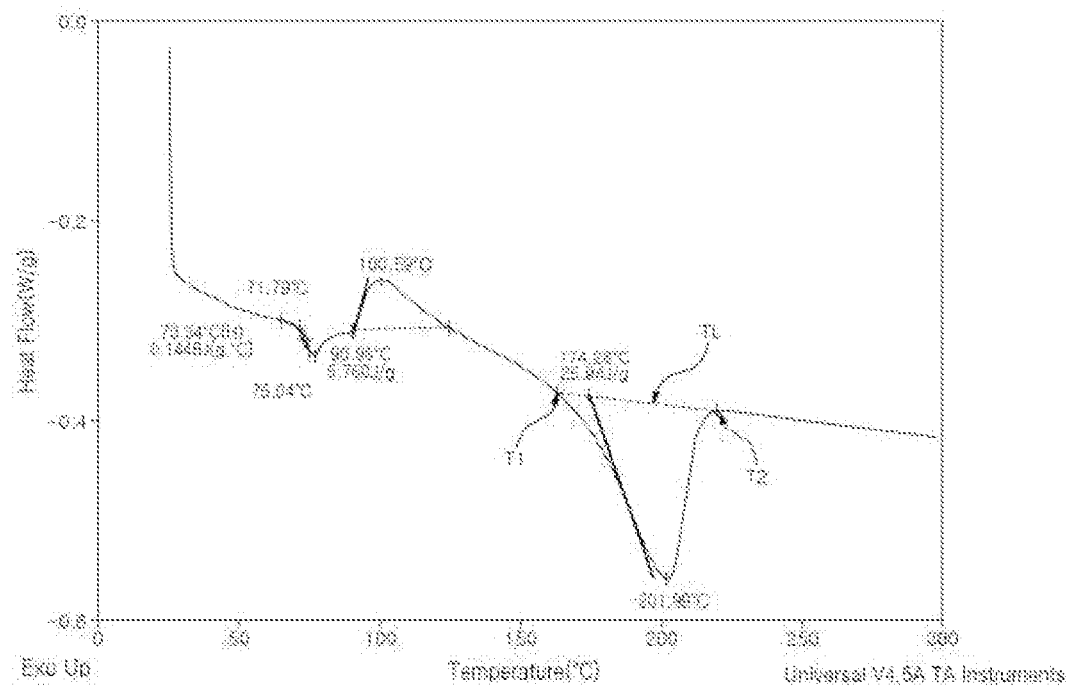

POLYESTER FILM, PREPARATION METHOD THEREOF AND METHOD FOR REPRODUCING POLYETHYLENETEREPHTHALATE CONTAINER USING SAME

TECHNICAL FIELD

Embodiments relate to a polyester film, to a process for preparing the same, and to a process for regenerating a polyethylene terephthalate container using the same. Specifically, the embodiments relate to a polyester film having excellent seaming characteristics and recyclability by virtue of controlled crystallinity, to a process for preparing the same, and to a process for regenerating a polyethylene terephthalate (PET) container provided with such a polyester film.

BACKGROUND ART

In recent years, as containers for beverages or foods are manufactured in various forms, or there are increased cases in which full packaging is applied in order to attract the attention of consumers, heat shrinkable labels and packaging materials are attracting attention. Such a heat shrinkable label or packaging material takes advantage of the feature of a polymer film that tends to shrink to a shape before stretching thereof at a certain temperature or higher once it has been oriented by stretching thereof. In a typical process of heat shrinkage labeling or packaging, a heat shrinkable film is cut, printed in a desired design, rolled up, bonded at both ends with an adhesive solvent, loosely wrapped around a container, and then shrunk as heat is applied thereto.

A film used in the above heat shrinkage process is required to have not only such basic properties as thermal resistance, chemical resistance, weatherability, and printability, but also container sealability, heat shrinkage uniformity, running characteristics in the longitudinal direction, and crack resistance. Conventionally, polyvinyl chloride films, polystyrene films, polypropylene films, and the like have been used for this heat shrinking process. In recent years, polyester films having such properties as high thermal resistance and weatherability, convenience of incineration, and excellent printability have been widely used.

However, since a conventional polyester film has a fast shrinkage speed and a high shrinkage stress, there have been defects caused by non-uniform shrinkage or distortions of a plastic container. Thus, Korean Laid-open Patent Publication No. 2002-0062838 discloses a technique in which 5% by weight or more of a polyester elastomer is added to a heat shrinkable polyester film to suppress the occurrence of wrinkles, shrinkage stains, distortions, and the like when the film is used for full packaging of plastic bottles.

As such, polyester films prepared with a lower crystallinity by blending a soft component with a polyester resin are used in the heat shrinkage process. Further, polyester films have been developed to have thermal properties such as shrinkage rate and shrinkage stress with respect to temperature, chemical resistance suitable for a seaming process, and recyclability that has recently emerged due to a waste plastic problem.

In addition, as concerns about environmental problems have increased in recent years, the recycling issues of products fabricated using thermoplastic polymers have become important. In particular, a polyethylene terephthalate (PET) resin having excellent properties in terms of thermal resistivity, processability, transparency, and non-toxicity has been widely used for producing various products such as films, fibers, bottles, containers, and the like, and efforts have been continued to increase the regeneration ratio thereof.

PRIOR ART DOCUMENT

Patent Document (Patent Document 1) Korean Laid-open Patent Publication No. 2002-0062838

DISCLOSURE OF INVENTION

Technical Problem

Accordingly, the embodiments aim to provide a polyester film having excellent seaming characteristics by virtue of controlled crystallinity and excellent recyclability, whereby non-uniform clumping rarely occurs even if it is thermally treated for a long period of time in the regeneration process thereof, a process for preparing the same, and a process for regenerating a polyethylene terephthalate container using the same.

Solution to Problem

According to an embodiment, there is provided a polyester film, which comprises a copolymerized polyester resin in which a diol and a dicarboxylic acid are copolymerized and optionally comprises a homopolyethylene terephthalate (HOMO-PET) resin, wherein the melting enthalpy ($\Delta Hm$) is 9 J/g or more as measured by differential scanning calorimetry, and the clumping ratio is 10% or less.

According to another embodiment, there is provided a process for preparing a polyester film, which comprises preparing a copolymerized polyester resin in which a diol and a dicarboxylic acid are copolymerized; optionally adding a homopolyethylene terephthalate (HOMO-PET) resin to the copolymerized polyester resin and then melt-extruding the resins at a temperature of 250° C. to 300° C. to prepare an unstretched sheet; and stretching the unstretched sheet and then heat-setting it at a temperature of 70° C. to 100° C. to prepare a polyester film, wherein the melting enthalpy ($\Delta Hm$) of the polyester film is 9 J/g or more as measured by differential scanning calorimetry, and the clumping ratio of the polyester film is 10% or less.

According to still another embodiment, there is provided a process for regenerating a polyethylene terephthalate container, which comprises providing a polyethylene terephthalate (PET) container provided with the polyester film; crushing the polyethylene terephthalate (PET) container provided with the polyester film to obtain flakes; and thermally treating the flakes to produce regenerated polyester chips, wherein the clumping ratio of the flakes is 10% or less, and the flakes comprise first flakes obtained by crushing the polyethylene terephthalate (PET) container and second flakes obtained by crushing the polyester film.

Advantageous Effects of Invention

In the polyester film according to an embodiment, the melting enthalpy ($\Delta Hm$) satisfies 9 J/g or more as measured by differential scanning calorimetry, whereby it is possible to easily control the crystallinity thereof, resulting in improved thermal properties and chemical characteristics. Accordingly, the polyester film according to an embodiment not only has an excellent shrinkage rate with respect to temperature, but also has excellent adhesive strength by a solvent even when applied to gravure printing, UV curing printing, and variable sleeve offset printing (VSOP), making it suitable for a heat shrinkage process and a seaming process.

Alternatively, the polyester film according to an embodiment satisfies a melting point (Tm) of 190° C. to 230° C. when measured by differential scanning calorimetry and a peel strength of 150 gf/3 cm or more, whereby it is possible to easily control the crystallinity thereof, resulting in improved thermal properties and chemical characteristics. Accordingly, the polyester film according to an embodiment not only has an excellent shrinkage rate with respect to temperature, but also has excellent adhesive strength by a solvent even when applied to gravure printing, UV curing printing, and variable sleeve offset printing (VSOP), making it suitable for a heat shrinkage process and a seaming process.

In addition, the polyester film has a low defect rate in the recycling process since the occurrence of clumping is suppressed in the thermal treatment process for a long period of time. Accordingly, it is possible to enhance the quality, yield, and productivity of the regenerated polyester chips produced through the regeneration process of a polyethylene terephthalate container using the polyester film.

Further, the process for regenerating a polyethylene terephthalate container according to the embodiment does not require a separate step of separating a container and a film. Thus, it is economical since time and cost are saved.

BRIEF DESCRIPTION OF DRAWING

FIG. 1 shows a polyester film applied to a product before and after heat shrinkage thereof.

FIG. 2 shows a method of measuring the clumping of a polyethylene terephthalate container provided with a polyester film.

FIG. 3 shows a method of measuring the peel strength of a polyester film.

FIG. 4 shows a method of measuring the heat shrinkage of a polyester film.

FIG. 5 shows a differential scanning calorimetry (DSC) curve of the polyester film of Example 1-3.

EXPLANATION OF REFERENCE NUMERALS d: diameter of a hole
x1: first dimension before shrinkage
x1: first dimension after shrinkage
y: second dimension
w: length to the adhesive part
TL: trend line
T1: melting start temperature
T2: melting completion temperature
1: product with a label
6: crusher
7: compressing weight
8: sieve
10a: second flakes
10b: clumped mixed flakes
11: label (before shrinkage)
11a: label after shrinkage
20: product
20a: first flakes
100: (first) polyester film (before shrinkage)
100a: polyester film after shrinkage
110: adhesive part
120: pressing plate
130: weight
200: second polyester film
300: sample A

BEST MODE FOR CARRYING OUT THE INVENTION

Hereinafter, the present invention will be described in detail with reference to embodiments. The embodiments are not limited to those described below. Rather, they can be modified into various forms as long as the gist of the invention is not altered.

Throughout the present specification, when a part is referred to as "comprising" an element, it is understood that other elements may be comprised, rather than other elements are excluded, unless specifically stated otherwise.

All numbers and expressions related to the quantities of components, reaction conditions, and the like used herein are to be understood as being modified by the term "about," unless otherwise indicated.

Throughout the present specification, the terms first, second, and the like are used to describe various components. But the components should not be limited by the terms. The terms are used only for the purpose of distinguishing one component from another.

Since it is difficult to recycle heat shrinkable labels or packaging materials composed of a polyester film despite their excellent thermal properties and chemical resistance, most of them are disposed of after use. This is because, when a polyester film is introduced into the current recycling process, that is, the regeneration process, the polyester film causes various process defects during the thermal treatment at high temperatures for a long period of time. Thus, although an additional process may be carried out to enhance the recyclability, there is a problem in that the process cost increases.

In addition, a method of adjusting the composition of a polyester film may be used in order to enhance the recyclability. In this case, when the polyester film is applied to gravure printing, UV curing printing, and variable sleeve offset printing (VSOP), the adhesive strength by a solvent is low due to its high crystallinity, making it unsuitable for a heat shrinkage process and a seaming process.

However, since the polyester film according to an embodiment has excellent thermal properties and chemical resistance, it is suitable for a heat shrinkage process and a seaming process, whereby it can be readily applied as various types of heat shrinkable labels and packaging materials and has excellent recyclability upon completion of its use.

In addition, polyethylene terephthalate (PET) containers recycled from the consumers have labels indicating the product information. Conventionally, once they have been washed and crushed, they are then subjected to liquid specific gravity separation, dehydration, drying, and/or wind specific gravity separation in order to remove a large amount of films contained in the crushed products and then to such an additional step as pelletization to obtain regenerated polyester chips. However, it is difficult to completely remove the films used as a label for polyethylene terephthalate (PET) containers even after the above process. There is a problem in that the regenerated polyester chips are colored due to the inks contained in the films. In addition, there has been a problem in that the regenerated polyester chips are non-uniformly clumped during the regeneration process, particularly the thermal treatment process, due to the thermal properties of the films.

Accordingly, a method of using a film made of a low specific gravity polymer such as polystyrene, polyethylene, polypropylene, and the like as a label has been proposed in order to readily carry out the specific gravity separation. In the specific gravity separation method, however, the low specific gravity thereof cannot be effectively achieved due to the ink layer, which still makes it difficult to completely separate and remove the films, and the problem that the residual ink colors the regenerated polyester chips cannot be solved.

The polyester film according to an embodiment is excellent in shrinkage characteristics by virtue of controlled crystallinity and in seaming characteristics in various printing methods and has excellent recyclability, whereby clumping rarely occurs even if it is thermally treated for a long period of time in the regeneration process. Accordingly, it is possible to enhance the quality, yield, and productivity of the regenerated polyester chips produced through the regeneration process of a polyethylene terephthalate (PET) container comprising the polyester film. In addition, the polyester film according to an embodiment can be advantageously applied as a heat shrinkable label or packaging material to containers of various types of products including beverages and foods.

Polyester Film

According to an embodiment, there is provided a polyester film, which comprises a copolymerized polyester resin in which a diol and a dicarboxylic acid are copolymerized and optionally comprises a homopolyethylene terephthalate (HOMO-PET) resin, wherein the melting enthalpy ($\Delta Hm$) is 9 J/g or more as measured by differential scanning calorimetry, and the clumping ratio is 10% or less.

According to another embodiment, there is provided a polyester film, which comprises a copolymerized polyester resin in which a diol and a dicarboxylic acid are copolymerized and optionally comprises a homopolyethylene terephthalate (HOMO-PET) resin, wherein the melting point (Tm) is 190° C. to 230° C. as measured by differential scanning calorimetry, the clumping ratio is 10% or less, and the peel strength is 150 gf/3 cm or more.

The polyester film according to an embodiment has a melting enthalpy ($\Delta Hm$) of 9 J/g or more as measured by differential scanning calorimetry. For example, the melting enthalpy ($\Delta Hm$) of the polyester film as measured by differential scanning calorimetry may be 9 J/g or more, 10 J/g or more, 12 J/g or more, or 15 J/g or more, 9 J/g to 33 J/g, 9 J/g to 30 J/g, 9 J/g to 28 J/g, 10 J/g to 33 J/g, 10 J/g to 30 J/g, 10 J/g to 28 J/g, 12 J/g to 33 J/g, 12 J/g to 30 J/g, 12 J/g to 28 J/g, 15 J/g to 33 J/g, 15 J/g to 30 J/g, or 15 J/g to 28 J/g.

Since the melting enthalpy of polyester film is adjusted within the above range, it is possible to effectively control the crystallinity of the polyester film, whereby the seaming characteristics as adhesive strength by a solvent are excellent, and the clumping ratio is very low in the regeneration process of the film or a polyethylene terephthalate (PET) container comprising the film, whereby it is possible to prevent environmental pollution while the recyclability is enhanced.

Specifically, if the melting enthalpy of the polyester film is less than the above range, the thermal properties are not good, whereby the clumping ratio may be increased in the regeneration process for recycling. In addition, if the melting enthalpy of the polyester film exceeds the above range, the clumping ratio may be lowered, whereas the peel strength may be deteriorated, so that it may be difficult to be used as a heat shrinkable film.

The differential scanning calorimeter (DSC) may be specifically a modulated differential scanning calorimeter (modulated DSC or MDSC), more specifically a temperature-modulated differential scanning calorimeter (TMDSC).

Specifically, melting enthalpy may be measured by scanning at a temperature elevation rate of 10° C./min using a differential scanning calorimeter (DSC) mode. More specifically, melting enthalpy may be measured by using a differential scanning calorimeter (DSC) by a first scan ($1^{st}$ scan) or a second scan ($2^{nd}$ scan). In the present specification, the melting enthalpy is measured by a first scan of the polyester film.

Glass transition temperature (Tg), crystallization temperature (Tc), and melting point (Tm) may be measured from the heat flow curve obtained by the scanning.

Specifically, in the heat flow curve obtained by scanning, the first endothermic temperature is a glass transition temperature (Tg), the exothermic temperature measured after the glass transition temperature (Tg) is a crystallization temperature (Tc), and the endothermic temperature measured after the crystallization temperature (Tc) is a melting point (Tm).

Here, the integral value at the melting point (Tm) is calculated as melting enthalpy. Specifically, melting enthalpy is energy in the section where endothermic occurs in the heat flow curve of differential scanning calorimetry. The trend line from the melting start temperature to the melting completion temperature is set as a baseline, and the integral value of the peak along the baseline is converted and calculated.

FIG. 5 shows a differential scanning calorimetry (DSC) curve of the polyester film of Example 1-3. Specifically, referring to FIG. 5, the first endothermic temperature of 73.34° C. is the glass transition temperature, the exothermic temperature of 100.59° C. measured after the glass transition temperature is the crystallization temperature, and the endothermic temperature of 201.99° C. measured after the crystallization temperature is the melting point (Tm). Here, the integral value of 25.94 J/g at the melting point is calculated as the melting enthalpy. More specifically, the trend line (TL) from the melting start temperature (T1) to the melting completion temperature (T2) is set as a baseline, and the integral value of the peak along the baseline is calculated as the melting enthalpy.

The polyester film may have a melting point (Tm) of 190° C. to 230° C. as measured by differential scanning calorimetry. For example, the film may have a melting point of 193° C. to 230° C., 195° C. to 228° C., or 195° C. to 225° C., as measured by differential scanning calorimetry.

Since the melting point of the polyester film is adjusted within the above range, the polyester film is effectively controlled in crystallinity, thereby having excellent seaming characteristics as adhesive strength by a solvent. In addition, since the clumping ratio is very low in the regeneration process of the film or a polyethylene terephthalate (PET) container comprising the film, it is possible to prevent environmental pollution while the recyclability is enhanced.

Specifically, if the melting point of the polyester film exceeds the above range, the adhesive strength of the polyester film by a solvent is lowered, so that it may be difficult to be used in a seaming process. If the melting temperature is lower than the above range, the clumping ratio may increase.

The polyester film may have a glass transition temperature (Tg) of 60° C. or higher as measured by differential scanning calorimetry. For example, the film may have a glass transition temperature (Tg) of 60° C. or higher, 65° C. or higher, 70° C. or higher, 60° C. to 85° C., 60° C. to 80° C., or 60° C. to 78° C., as measured by differential scanning calorimetry.

In addition, the crystallization temperature of the polyester film is not measured or is 70° C. to 130° C., as measured by differential scanning calorimetry. For example, the crystallization temperature (Tc) of the film is not measured or may be 80° C. to 130° C., 85° C. to 125° C., 90° C. to 125° C., 96° C. to 125° C., or 98° C. to 120° C., as measured by differential scanning calorimetry. Since the crystallization temperature of the polyester film is adjusted within the above range, it is possible to effectively control the crystallinity of the polyester film, whereby the clumping ratio is very low in the regeneration process of the film or a polyethylene terephthalate (PET) container comprising the film. Thus, it is possible to prevent environmental pollution while the recyclability is enhanced.

The heat of crystallization of the film may be 0.01 J/g to 50 J/g as measured at the crystallization temperature (Tc). For example, the heat of crystallization may be calculated as an integral value at the crystallization temperature (Tc). The heat of crystallization of the film may be 0.01 J/g to 40 J/g, 0.05 J/g to 30 J/g, 0.1 J/g to 20 J/g, 0.1 J/g to 10 J/g, 0.2 J/g to 10 J/g, 0.3 J/g to 10 J/g, or 0.5 J/g to 9 J/g, as measured at the crystallization temperature (Tc). Since the heat of crystallization of the polyester film satisfies the above range, it is possible to effectively control the crystallinity of the polyester film, whereby the clumping ratio is very low in the regeneration process of the film or a polyethylene terephthalate (PET) container comprising the film. Thus, it is possible to prevent environmental pollution while the recyclability is enhanced.

In addition, the polyester film has a clumping ratio of 10% or less. For example, when the flakes obtained by crushing a polyethylene terephthalate (PET) container provided with the polyester film are subjected to a pressure of 8.7 kPa and thermally treated at 210° C. for 90 minutes, the clumping ratio may be 9% or less, 8.5% or less, 8% or less, 6% or less, 5% or less, 4% or less, preferably, 3% or less, 2% or less, 1.5% or less, 1% or less, 0.8% or less, 0.5% or less Clumping refers to an aggregate that may be formed in the regeneration process. The size of the aggregate may be, for example, at least three times the size of the flake particles before the thermal treatment. The clumping ratio refers to the fraction of the aggregates based on the total weight of the initially mixed flakes, that is, the flakes before the thermal treatment. It may be calculated by the following Equation 1.

$$\text{Clumping ratio (\%)} = \frac{\text{Weight of aggregated mixed flakes}}{\text{Weight of mixed flakes before thermal treatment}} \times 100 \quad \text{[Equation 1]}$$

Specifically, in the regeneration process of a polyethylene terephthalate (PET) container in which a film is provided as a label, the flakes obtained by crushing them are passed through a sieve and then subjected to a thermal treatment process. In such event, aggregates may be formed as the crushed flakes are clumped, which aggregate is called clumping. The aggregates are again filtered through a sieve, and the weight is measured. The weight ratio of the aggregates based on the total weight of the flakes before the thermal treatment is calculated as a clumping ratio. Thus, the higher the value of the clumping ratio, the lower the recyclability.

Since the polyester film according to an embodiment is effectively controlled in crystallinity, there are no wrinkles when applied as a label for a polyethylene terephthalate (PET) container or distortions of the polyethylene terephthalate container. In addition, even if the flakes crushed together with a polyethylene terephthalate container upon completion of its use are thermally treated during the regeneration process, the clumping ratio is very low. Thus, it is possible to enhance the recyclability, as well as to enhance the quality, yield, and productivity of regenerated polyester chips produced by recycling.

If flakes are fused to form clumps in the regeneration process, it may cause various problems. Thus, the U.S. Association of Plastic Recyclers (APR) is preparing a procedure (APR PET-S-08) to evaluate a clumping ratio. Specifically, when 3 parts by weight of a polyester film and 97 parts by weight of a polyethylene terephthalate container are crushed to a particle diameter of 9.5 mm or less, respectively, and are thermally treated for 90 minutes at a temperature of 210° C. under a pressure of 8.7 kPa (i.e., a load of 2.5 kgf applied to a cylinder having a diameter of 6 cm), the clumping ratio may refer to the ratio of clumps that fail to pass through a sieve with a hole size of 11.2 mm (or a 0.625" sieve).

In addition, the polyester film according to an embodiment may have excellent adhesive strength by a solvent, that is, seaming characteristics.

Specifically, the polyester film according to an embodiment may have a peel strength of 150 gf/3 cm or more. For example, the peel strength may be 150 gf/3 cm or more, 180 gf/3 cm or more, 200 gf/3 cm or more, 230 gf/3 cm or more, 250 gf/3 cm or more, 300 gf/3 cm or more, or 330 gf/3 cm or more, 150 gf/3 cm to 3,000 gf/3 cm, 180 gf/3 cm to 2,800 gf/3 cm, 200 gf/3 cm to 2,500 gf/3 cm, 250 gf/3 cm to 2,000 gf/3 cm, 300 gf/3 cm to 3,000 gf/3 cm, 300 gf/3 cm to 2,500 gf/3 cm, 300 gf/3 cm to 2,000 gf/3 cm, 330 gf/3 cm to 1,500 gf/3 cm, or 330 gf/3 cm to 1,300 gf/3 cm. Since the peel strength is adjusted within the above range, the polyester film has excellent seaming characteristics as adhesive strength by a solvent and is suitable for use in a seaming process.

The peel strength may be measured using two sheets of the polyester film (i.e., a first polyester film and a second polyester film). Specifically, 1,3-dioxolane is applied to one side of a first polyester film in the form of a band having a width of 2 mm and a length of 30 mm to form an adhesive part, and a second polyester film is laminated on the first polyester film on which the adhesive part has been formed. In such event, the second polyester film is immediately laminated while 1,3-dioxolane is applied. A pressure of 160 Pa is applied to the adhesive part for 1 hour for aging, and the maximum force is then measured as the peel strength when the first and second polyester films are delaminated at a speed of 300 mm/min and an angle of 180°.

In addition, in the polyester film according to an embodiment, the shrinkage rate in the main shrinkage direction with respect to temperature may be adjusted within a specific range. Specifically, the polyester film according to an embodiment may be a heat shrinkable film. For example, when the shrinkage rate in the main shrinkage direction of the polyester film upon thermal treatment at a temperature of X° C. for 10 seconds is defined as Tx, the ranges of $T_{70}$, $T_{80}$, $T_{90}$, and $T_{100}$ may be adjusted. The thermal treatment for obtaining $T_x$ may specifically refer to immersing the polyester film in hot water at X° C. for 10 seconds.

Specifically, the film may have a heat shrinkage rate ($T_{70}$) of 0% to 50% in a first direction upon thermal treatment at a temperature of 70° C. for 10 seconds. For example, $T_{70}$ may be 0.1% to 50%, 0.5% to 48%, 0.5% to 46%, 2% to 46%, or 3.5% to 45.5%.

In the present specification, the first direction may be the transverse direction (TD) or the longitudinal direction (MD), and a second direction perpendicular to the first direction may be the longitudinal direction (MD) or the transverse direction (TD). Specifically, the first direction may be the transverse direction (TD) as the main shrinkage direction, and the second direction may be the longitudinal direction (MD).

In addition, the film may have a heat shrinkage rate ($T_{80}$) of 20% or more in a first direction upon thermal treatment at a temperature of 80° C. for 10 seconds. For example, $T_{80}$ may be 23% or more, 25% or more, 40% or more, 45% or more, 50% or more, or 55% or more, 20% to 85%, 23% to 80%, 25% to 75%, 40% to 85%, 45% to 80%, 50% to 78%, or 55% to 75%.

The film may have a heat shrinkage rate ($T_{90}$) of 40% or more in a first direction upon thermal treatment at a temperature of 90° C. for 10 seconds. For example, $T_{90}$ may be 50% or more, 60% or more, or 70% or more, 40% to 85%, 50% to 80%, 60% to 78%, or 70% to 80%.

In addition, the film may have a heat shrinkage rate ($T_{100}$) of 45% to 85% in a first direction upon thermal treatment at a temperature of 100° C. for 10 seconds. For example, $T_{100}$ may be 45% to 80%, 50% to 80%, 65% to 80%, 70% to 80%, 70% to 78%, or 73% to 78%. Since the heat shrinkage rate in the first direction upon thermal treatment at 80° C. for 10 seconds satisfy the above range, it is convenient to conduct the labeling process in which the film surrounds at least a portion of a container. Specifically, there are no wrinkles when the film is applied as a label for a polyethylene terephthalate (PET) container or distortions of the polyethylene terephthalate container.

Meanwhile, in the polyester film according to an embodiment, the shrinkage rate in the first direction and the second direction perpendicular to the first direction with respect to temperature may be adjusted within a specific range. For example, when the shrinkage rate in the second direction of the polyester film upon thermal treatment at a temperature of X° C. for 10 seconds is defined as $T_x'$, the ranges of $T_{70}'$, $T_{75}'$, $T_{80}'$, $T_{90}'$, and $T_{100}'$ may be adjusted within specific ranges. The thermal treatment for obtaining $T_x'$ may refer to immersing the polyester film in hot water at X° C. for 10 seconds.

$T_{70}'$, $T_{75}'$, $T_{80}'$, $T_{90}'$, and $T_{100}'$ of the polyester film may each independently be −10% to 10%. For example, $T_{70}'$, $T_{75}'$, $T_{80}'$, $T_{90}'$, and $T_{100}'$ of the polyester film may each be −10% or more, −8% or more, −6% or more, −4% or more, −2% or more, 0% or more, and 10% or less, 8% or less, 6% or less, 4% or less, or 2% or less.

Specifically, the film may have a heat shrinkage rate ($T_{100}'$) of 7% or less in a second direction perpendicular to the first direction upon thermal treatment at a temperature of 100° C. for 10 seconds. For example, $T_{100}'$ may be 7% or less or 6% or less, −16% to 7%, −10% to 7%, −7% to 7%, −5% to 7%, 0% to 7%, 0.5% to 7%, or 2% to 6%.

In addition, the polyester film may have a light transmittance of 90% or more at a wavelength of 550 nm. Specifically, the light transmittance of the film measured at a wavelength of 550 nm before and after immersion in an aqueous solution of sodium hydroxide (NaOH) having a concentration of 1% at 85° C. may be 90.5% or more, 91% or more, 92% or more, or 93% or more, respectively.

The change in light transmittance of the polyester film before and after immersion in an aqueous solution of sodium hydroxide (NaOH) having a concentration of 1% at 85° C. may be 0.7% or less. For example, the change in light transmittance of the film before and after the immersion may be 0.6% or less or 0.5% or less.

The change in light transmittance refers to an absolute value of the difference between the light transmittance of the film measured at a wavelength of 550 nm before the immersion and the light transmittance of the film measured at a wavelength of 550 nm after the immersion.

In addition, the change (ΔL) in Col-L may be 0.7 or less, the change (Δa) in Col-a may be 0.5 or less, and the change (Δb) in Col-b may be 0.5 or less, before and after immersion of the film in an aqueous solution of sodium hydroxide (NaOH) having a concentration of 1% at 85° C. For example, the change (ΔL) in Col-L may be 0.65 or less, 0.6 or less, 0.55 or less, or 0.5 or less, the change (Δa) in Col-a may be 0.3 or less, 0.1 or less, 0.08 or less, 0.06 or less, or 0.05 or less, and the change (Δb) in Col-b may be 0.3 or less, 0.1 or less, 0.08 or less, or 0.07 or less, before and after the immersion.

The change (ΔL) in Col-L refers to an absolute value of the difference between the Col-L value before the immersion and the Col-L value after the immersion, the change (Δa) in Col-a refers to an absolute value of the difference between the Col-a value before the immersion and the Col-a value after the immersion, and the change (Δb) in Col-b refers to an absolute value of the difference between the Col-b value before the immersion and the Col-b value after the immersion.

Col-L, Col-a, and Col-b are color coordinates established by the Commission International d'Eclairage (CIE), where color is represented by L (brightness), a (green to red complementary color), and b (yellow to blue complementary color). They can be measured using UltraScan PRO (manufacturer: Hunterlab), but it is not limited thereto.

The polyester film according to an embodiment comprises a copolymerized polyester resin. Specifically, the copolymerized polyester resin may be one in which two or three or more diols and a dicarboxylic acid are polymerized. More specifically, it may be a copolymerized polyethylene terephthalate (Co-PET) resin.

Specifically, the diol may comprise at least one selected from the group consisting of ethylene glycol, diethylene glycol, neopentyl glycol, propanediol unsubstituted or substituted with an alkyl group, butanediol unsubstituted or substituted with an alkyl group, pentanediol unsubstituted or substituted with an alkyl group, hexanediol unsubstituted or substituted with an alkyl group, octanediol unsubstituted or substituted with an alkyl group, and a combination thereof.

For example, the diol may comprise at least one selected from the group consisting of ethylene glycol, diethylene glycol, neopentyl glycol, 1,3-propanediol, 1,2-octanediol, 1,3-octanediol, 2,3-butanediol, 1,3-butanediol, 1,4-butanediol, 1,5-pentanediol, 2-butyl-2-ethyl-1,3-propanediol, 2,2-diethyl-1,5-pentanediol, 2,4-diethyl-1,5-pentanediol, 3-methyl-1,5-pentanediol, and 1,1-dimethyl-1,5-pentanediol.

The dicarboxylic acid may comprise an aromatic dicarboxylic acid, an aliphatic dicarboxylic acid, an alicyclic dicarboxylic acid, or an ester thereof.

For example, the dicarboxylic acid may be terephthalic acid, dimethylterephthalic acid, isophthalic acid, naphthalene dicarboxylic acid, orthophthalic acid, adipic acid, azelaic acid, sebacic acid, decanedicarboxylic acid, an ester thereof, or a combination thereof. Specifically, the dicarboxylic acid may comprise at least one selected from the group consisting of terephthalic acid, dimethyl terephthalate, naphthalene dicarboxylic acid, and orthophthalic acid.

According to an embodiment, the copolymerized polyester resin may be one in which two or three or more diols and an aromatic dicarboxylic acid are polymerized. Specifically, the copolymerized polyester resin may be one in which diols comprising ethylene glycol and at least one comonomer and an aromatic dicarboxylic acid are polymerized.

The diol may comprise ethylene glycol and at least one comonomer selected from the group consisting of neopentyl glycol and diethylene glycol. In addition, the polyester film may comprise ethylene glycol and at least one comonomer selected from the group consisting of neopentyl glycol and diethylene glycol.

Specifically, the polyester film may comprise ethylene glycol in an amount of 50% by mole to 90% by mole. For example, the polyester film may comprise ethylene glycol in an amount of 60% by mole to 90% by mole, 65% by mole to 88% by mole, 68% by mole to 85% by mole, or 70% by mole to 83% by mole.

In addition, the polyester film may comprise at least one comonomer selected from the group consisting of neopentyl glycol and diethylene glycol in an amount of 10% by mole or more. For example, the polyester film may comprise at least one comonomer selected from the group consisting of neopentyl glycol and diethylene glycol in an amount of 10% by mole or more, 13% by mole or more, or 15% by mole or more, 10% by mole to 30% by mole, 10% by mole to 29% by mole, 10% by mole to 28% by mole, 15% by mole to 30% by mole, 15% by mole to 29% by mole, or 15% by mole to 28% by mole. Since the content of the comonomer satisfies the above range, it is possible to more effectively control the crystallinity while the heat shrinkage rate in the main shrinkage direction is excellent.

In addition, if the content of the comonomer is less than the above range, the heat shrinkage characteristics of the polyester film may be deteriorated. Specifically, the heat shrinkage rate of the polyester film in the main shrinkage direction may not be sufficient at a specific temperature, and the heat shrinkage rate of the polyester film in the direction perpendicular to the main shrinkage direction may be too large at a particular temperature.

Specifically, the polyester film may comprise diethylene glycol as a comonomer. For example, the content of diethylene glycol may be 1% by mole to 10% by mole, 1% by mole to 8% by mole, 3% by mole to 6% by mole, 3.5% by mole to 5.5% by mole, or 3.8% by mole to 5.2% by mole.

In addition, the polyester film may comprise neopentyl glycol as a comonomer. For example, the content of neopentyl glycol may be 5% by mole to 35% by mole, 7% by mole to 33% by mole %, 10% by mole to 30% by mole, 13% by mole to 28% by mole, or 15% by mole to 25% by mole.

Since the content of neopentyl glycol satisfies the above range, the heat shrinkage rate in a first direction or in a second direction perpendicular to the first direction is readily adjusted when the polyester film is thermally shrunk, so that it is possible to more effectively prevent wrinkles or deformation when the film is applied to a container.

In addition, the polyester film may comprise both diethylene glycol and neopentyl glycol as a comonomer. When the polyester film comprises diethylene glycol and neopentyl glycol as a comonomer, the molar ratio of neopentyl glycol to diethylene glycol may be 1:3 to 6, 1:3 to 5, or 1:3 to 4.

In addition, the polyester film may further comprise a monohydric alcohol in addition to the diol component. For example, the monohydric alcohol may be methanol, ethanol, isopropyl alcohol, allyl alcohol, or benzyl alcohol. For example, the polyester film may further comprise a monohydric alcohol in an amount of 10% by mole to 30% by mole, 13% by mole to 25% by mole, or 15% by mole to 22% by mole, but it is not limited thereto.

The dicarboxylic acid may comprise an aromatic dicarboxylic acid. For example, the polyester film may comprise terephthalic acid or dimethyl terephthalic acid in an amount of 80% by mole or more, 90% by mole or more, 95% by mole or more, 99% by mole or more, or 100% by mole.

The copolymerized polyester resin may be obtained by transesterification of a diol and a dicarboxylic acid, followed by polymerization thereof.

Specifically, at least one catalyst selected from manganese acetate, calcium acetate, and zinc acetate may be used as a catalyst for the transesterification reaction. The content of the catalyst may be 0.02 part by weight to 0.2 part by weight, 0.02 part by weight to 0.1 part by weight, or 0.05 part by weight to 0.1 part by weight, based on the total weight of the dicarboxylic acid.

In addition, upon completion of the transesterification reaction, at least one additive selected from the group consisting of silica, potassium, and magnesium; a stabilizer such as trimethyl phosphate; a polymerization catalyst such as antimony trioxide and tetrabutylene titanate; and the like may be selectively added.

The polyester film according to an embodiment optionally comprises a homopolyethylene terephthalate (HOMO-PET) resin. Since the polyester film further comprises a homopolyethylene terephthalate resin, the thermal properties of the film may be further enhanced.

The homopolyethylene terephthalate (HOMO-PET) resin refers to a resin containing a polyethylene terephthalate structure in which terephthalic acid (TPA) or dimethylterephthalic acid (DMT) is polymerized with ethylene glycol (EG) in an amount of 90% by weight or more, 95% by weight or more, 97% by weight or more, or 98% by weight or more.

For example, the homopolyethylene terephthalate (HOMO-PET) resin may be one that has been recycled.

Specifically, the homopolyethylene terephthalate (HOMO-PET) resin may be obtained by recycling a container to which a polyester film, specifically a polyester heat shrinkable film, has been attached. Alternatively, the homopolyethylene terephthalate (HOMO-PET) resin may be obtained by recycling a polyester film and a polyester fiber together. The container may have a form capable of containing or packaging a product. For example, it may be a polyester bottle, a polyester tray, a polyester pouch, a polyester sheet, a polyester thermomolded product, or a polyester packaging material.

The polyester film may comprise the homopolyethylene terephthalate (HOMO-PET) resin in an amount of 0.5% by weight to 37% by weight. For example, the content of the homopolyethylene terephthalate (HOMO-PET) resin may be 0.5% by weight to 37% by weight, 1% by weight to 37% by weight, 2% by weight to 37% by weight, 2% by weight to 35% by weight, 2% by weight to 30% by weight, 2% by weight to 27% by weight, 2% by weight to 25% by weight, 2% by weight to 20% by weight, 3% by weight to 37% by weight, 3% by weight to 35% by weight, 3% by weight to 30% by weight, or 3% by weight to 25% by weight, based on the total weight of the copolymerized polyester resin and the homopolyethylene terephthalate (HOMO-PET) resin.

Since the content of the homopolyethylene terephthalate (HOMO-PET) resin satisfies the above range, it is possible to effectively control the crystallinity of the polyester film, whereby the seaming characteristics as adhesive strength by a solvent are excellent, and the clumping ratio is very low in the regeneration process of the film or a polyethylene terephthalate (PET) container comprising the film. Thus, it is possible to prevent environmental pollution while the recyclability is enhanced.

Specifically, if the content of the homopolyethylene terephthalate resin exceeds the above range, the thermal properties may be enhanced, resulting in an increase in the effect of preventing the clumping phenomenon, whereas the seaming characteristics may be deteriorated.

The polyester film may have a thickness of 10 μm to 100 μm. For example, the thickness of the polyester film may be 20 μm to 80 μm, 30 μm to 70 μm, 35 μm to 65 μm, 35 μm to 55 μm, 40 μm to 60 μm, or 35 μm to 45 μm.

Process for Preparing a Polyester Film

According to another embodiment, there is provided a process for preparing a polyester film, which comprises preparing a copolymerized polyester resin in which a diol and a dicarboxylic acid are copolymerized; optionally adding a homopolyethylene terephthalate (HOMO-PET) resin to the copolymerized polyester resin and then melt-extruding the resins at a temperature of 250° C. to 300° C. to prepare an unstretched sheet; and stretching the unstretched sheet and then heat-setting it at a temperature of 70° C. to 100° C. to prepare a polyester film, wherein the melting enthalpy (ΔHm) of the polyester film is 9 J/g or more as measured by differential scanning calorimetry, and the clumping ratio of the polyester film is 10% or less.

According to still another embodiment, there is provided a process for preparing a polyester film, which comprises preparing a copolymerized polyester resin in which a diol and a dicarboxylic acid are copolymerized; optionally adding a homopolyethylene terephthalate (HOMO-PET) resin to the copolymerized polyester resin and then melt-extruding the resins at a temperature of 250° C. to 300° C. to prepare an unstretched sheet; and stretching the unstretched sheet and then heat-setting it at a temperature of 70° C. to 100° C. to prepare a polyester film, wherein the polyester film has a melting point (Tm) of 190° C. to 230° C. as measured by differential scanning calorimetry, a clumping ratio of 10% or less, and a peel strength of 150 gf/3 cm or more.

The composition and process conditions are adjusted such that the polyester film finally produced by the above process satisfies the characteristics (melting enthalpy, melting point, shrinkage characteristics, and the like) as discussed above. Specifically, in order for the final polyester film to satisfy the characteristics as discussed above, the composition of the copolymerized polyester resin is adjusted, the extrusion temperature, the casting temperature, the preheating temperature at the time of stretching, the stretching ratio in each direction, the stretching temperature, the stretching speed, and the like are adjusted, or thermal treatment and relaxation is carried out after stretching while the thermal treatment temperature and relaxation rate are adjusted.

Hereinafter, each step will be described in more detail.

First, a copolymerized polyester resin is prepared. Details on the copolymer polyester resin are as described above.

Specifically, the polymerization of the copolymerized polyester resin may be carried out through a conventional transesterification reaction and polycondensation reaction. In such event, the diol and dicarboxylic acid components used and their contents are as exemplified above.

Thereafter, a homopolyethylene terephthalate (HOMO-PET) resin is optionally added to the copolymerized polyester resin, which is melt-extruded at a temperature of 250° C. to 300° C. to prepare an unstretched sheet.

Specifically, the copolymerized polyester resin or the copolymerized polyester resin to which a homopolyethylene terephthalate (HOMO-PET) resin has been added is melt-extruded at a temperature of 250° C. to 300° C. or 260° C. to 300° C. through a T-die and then cooled to prepare an unstretched sheet. Details on the homopolyethylene terephthalate (HOMO-PET) resin are as described above.

The unstretched sheet is passed through a chamber to be preheated while it is conveyed at a speed of 10 m/minute to 110 m/minute, 25 m/minute to 90 m/minute, 40 m/minute to 80 m/minute, or 50 m/minute to 60 m/minute.

The preheating may be carried out at 100° C. to 120° C. for 0.01 minute to 1 minute. For example, the preheating temperature may be 100° C. to 120° C. or 100° C. to 117° C., and the preheating time may be 0.05 minute to 0.5 minute or 0.05 minute to 0.2 minute.

Thereafter, the preheated unstretched sheet is stretched at a temperature of 70° C. to 95° C. For example, the stretching may be carried out at 70° C. to 95° C., 75° C. to 95° C., or 80° C. to 90° C.

Specifically, the stretching may be uniaxial stretching or biaxial stretching. More specifically, the stretching may be uniaxial stretching carried out in the transverse direction (TD), or biaxial stretching carried out in the longitudinal direction (MD) and then in the transverse direction (TD).

If the stretching is uniaxial stretching, the stretching may be carried out in the transverse direction (TD) at a stretching ratio of 3.5 times to 5 times, 3.5 times to 4.8 times, or 3.8 times to 4.6 times. In addition, if the stretching is biaxial stretching, the stretching may be carried out in the longitudinal direction (MD) at a stretching ratio of 1.1 times to 2 times or 1.1 times to 1.5 times, and then in the transverse direction (TD) at a stretching ratio of 3.5 times to 5 times, 3.5 times to 4.8 times, or 3.8 times to 4.6 times.

In addition, a coating step may be further carried out after the stretching. Specifically, a coating step may be further carried out before the uniaxial stretching in the transverse direction (TD) or before stretching in the transverse direction after stretching in the longitudinal direction. More specifically, a coating step may be further carried out for forming a promoting layer or the like capable of imparting functionality such as antistatic or the like to the film. The coating step may be carried out by spin coating or in-line coating, but it is not limited thereto.

Thereafter, the stretched sheet is heat-set at a temperature of 70° C. to 100° C. to prepare a polyester film.

The heat setting may be annealing and carried out at a temperature of 70° C. to 100° C. or 70° C. to 95° C. for 0.01 minute to 1 minute or 0.05 minute to 0.5 minute.

Process for Regenerating a Polyethylene Terephthalate Container

According to still another embodiment, there is provided a process for regenerating a polyethylene terephthalate container, which comprises providing a polyethylene terephthalate (PET) container provided with the polyester film; crushing the polyethylene terephthalate (PET) container provided with the polyester film to obtain flakes; and thermally treating the flakes to produce regenerated polyester chips, wherein the clumping ratio of the flakes is 10% or less, and the flakes comprise first flakes obtained by crushing the polyethylene terephthalate (PET) container and second flakes obtained by crushing the polyester film.

In order to regenerate a polyethylene terephthalate (PET) container according to an embodiment, a polyethylene terephthalate (PET) container at least a portion of which is surrounded by the polyester film is prepared.

Conventionally adopted was a process, which comprises washing recycled waste products in which containers, metals, glass, and plastics may be intermingled to classify polyester containers and removing the films or like wrapping the containers in order to enhance the recyclability and quality of the containers. The removal step has been carried out by mechanically tearing or cutting the films or by such an additional step as liquid specific gravity separation, dehydration, drying, wind specific gravity separation, or pelletization.

However, it was difficult to completely remove the films in the above removal step. In particular, it was difficult to enhance the quality of the regenerated polyester chips thus produced due to the residual ink that had been formed on the films.

In the process for regenerating a polyester container according to an embodiment, it is possible to produce regenerated polyester chips without an additional step of removing the film surrounding the polyethylene terephthalate (PET) container, whereby the cost is saved.

In the polyethylene terephthalate (PET) container, the polyester film is provided on the outer surface of the container. Specifically, the outer surface of the polyethylene terephthalate container is covered with the polyester film, and the film may be shrunk by steam or hot air to surround at least a portion of the outer surface of the polyethylene terephthalate container. For example, the polyester film, as a heat shrinkable film, may be a label of the polyethylene terephthalate container, but it is not limited thereto.

Details on the polyester film are as described above.

Thereafter, the polyethylene terephthalate (PET) container provided with the film is crushed to obtain flakes.

Specifically, at least a portion of the outer surface of the polyethylene terephthalate (PET) container is surrounded by the film, and the container and the film are crushed together to obtain flakes without a step of separating the container and the film.

That is, the flakes comprise first flakes obtained by crushing the polyester container and second flakes obtained by crushing the film.

The particle size of the first flakes may be 0.1 mm to 25 mm, and the particle size of the second flakes may be 0.1 mm to 25 mm. For example, the particle size of the first flakes may be 0.3 mm to 23 mm, 0.5 mm to 20 mm, 1 mm to 20 mm, 0.5 mm to 15 mm, 0.5 mm to 13 mm, 1 mm to 18 mm, 1 mm to 15 mm, 1 mm to 13 mm, or 2 mm to 10 mm, and the particle size of the second flakes may be 0.3 mm to 23 mm, 0.5 mm to 20 mm, 1 mm to 20 mm, 0.5 mm to 15 mm, 0.5 mm to 13 mm, 1 mm to 18 mm, 1 mm to 15 mm, 1 mm to 13 mm, or 2 mm to 10 mm, but they are not limited thereto.

Thereafter, a step of washing the crushed flakes may be further carried out before the thermal treatment step. Specifically, the washing step may be carried out with a washing solution containing water and/or an aqueous solution of 1 part by weight of sodium hydroxide at a temperature of 85° C. to 90° C.

For example, the crushed flakes may be first washed with water, second washed with the washing solution, and then third washed again with water. As the washing step is carried out, it is possible to remove impurities that may remain in the crushed flakes, as well as to effectively remove the ink component. Thus, it is possible to enhance the quality and purity of the regenerated polyester chips thus produced, thereby maximizing the recyclability.

In addition, after the washing step, a step of drying the washed flakes may be further carried out at 60° C. to 175° C. for 10 minutes to 90 minutes. For example, the drying step may be carried out at 65° C. to 175° C., 70° C. to 170° C., 90° C. to 165° C., 100° C. to 165° C., or 120° C. to 165° C., 140° C. to 165° C., or 150° C. to 165° C. for 10 minutes to 85 minutes, 10 minutes to 70 minutes, or 15 minutes to 30 minutes.

The washing and drying steps may be carried out once to five times repeatedly. For example, impurities remaining in the flakes can be effectively removed by repeatedly carrying out the washing and drying steps two to five times or three to five times in order.

Finally, the flakes are thermally treated to produce regenerated polyester chips.

Specifically, the flakes comprise first flakes obtained by crushing the polyethylene terephthalate (PET) container and second flakes obtained by crushing the polyester film.

The thermal treatment may be carried out at 200° C. to 220° C. for 60 minutes to 120 minutes. For example, the thermal treatment may be carried out at 200° C. to 215° C. or 205° C. to 220° C. for 70 minutes to 120 minutes or 80 minutes to 120 minutes.

In addition, the clumping ratio of the flakes is 10% or less. Specifically, when the flakes are subjected to a pressure of 8.7 kPa and thermally treated at a temperature of 210° C. for 90 minutes, the clumping ratio may be 10% or less. For example, when the flakes are subjected to a pressure of 8.7 kPa and thermally treated at 210° C. for 90 minutes, the clumping ratio may be 9% or less, 8.5% or less, 8% or less, 6% or less, 5% or less, 4% or less, preferably, 3% or less, 2% or less, 1.5% or less, 1% or less, 0.8% or less, 0.5% or less.

Since the crumping fraction that may be caused as the first flakes and the second flakes are entangled together is low, the quality of regenerated chips prepared is excellent. Specifically, since the flakes comprise second flakes obtained by crushing the polyester film according to an embodiment, it is possible to effectively reduce or prevent the formation of aggregates, thereby enhancing the quality of regenerated polyester chips thus produced.

Regenerated polyester chips may be obtained after the thermal treatment step. Specifically, the regenerated polyester chips that comprise the first flakes and the second flakes may be obtained after the thermal treatment step. For example, the flakes may be melt-extruded and cut to obtain regenerated polyester chips, but it is not limited thereto.

Regenerated Polyester Chips

According to still another embodiment, there are provided regenerated polyester chips produced by the process for regenerating a polyethylene terephthalate container.

Specifically, the regenerated polyester chips may comprise first flakes comprising polyethylene terephthalate (PET) and second flakes comprising a polyester resin.

The regenerated polyester chips may have an intrinsic viscosity (IV) of 0.55 dl/g or more. For example, the regenerated polyester chips may have an intrinsic viscosity (IV) of 0.58 dl/g or more, or 0.59 dl/g or more, 0.55 dl/g to 3.0 dl/g, 0.55 dl/g to 2.0 dl/g, 0.55 dl/g to 1.0 dl/g, 0.58 dl/g to 0.85 dl/g, or 0.58 dl/g 0.7 dl/g.

In addition, the regenerated polyester chips may comprise polyethylene terephthalate in an amount of 70% by weight to 99% by weight and a copolymerized polyester resin in an amount of 1% by weight to 30% by weight, based on the total weight of regenerated polyester chips. For example, the regenerated polyester chips may comprise polyethylene terephthalate in an amount of 80% by weight to 99% by weight, 90% by weight to 99% by weight, or 95% by weight to 99% by weight and a copolymerized polyester resin in an amount of 1% by weight to 20% by weight, 1% by weight to 10% by weight, or 1% by weight to 5% by weight, based on the total weight of the regenerated polyester chips.

MODE FOR THE INVENTION

Hereinafter, the present invention will be described in more detail with reference to the following examples. However, these examples are set forth to illustrate the present invention, and the scope of the present invention is not limited thereto.

EXAMPLE

Preparation of a Polyester Film

Example 1-1

(1) Preparation of a Copolymerized Polyester Resin

An autoclave (or first reactor) equipped with a stirrer and a distillation column was charged with 100% by mole of terephthalic acid (TPA) as a dicarboxylic acid and 75.6% by mole of ethylene glycol (EG), 18.8% by mole of neopentyl glycol (NPG), and 5.6% by mole of diethylene glycol (DEG) as a diol. 0.07 part by weight of manganese acetate as a transesterification catalyst was added per 100 parts by weight of the dicarboxylic acid, followed by heating the mixture to 220° C. and the removal of methanol produced as a byproduct to carry out the reaction.

Upon completion of the transesterification reaction, 0.07 part by weight of silica having an average particle diameter of 0.28 μm was added per 100 parts by weight of the dicarboxylic acid, and 0.4 part by weight of trimethyl phosphate as a stabilizer was added. After 5 minutes, 0.035 part by weight of antimony trioxide and 0.005 part by weight of tetrabutylene titanate were added as a polymerization catalyst, followed by stirring for 10 minutes. Thereafter, the reaction mixture was transferred to a second reactor equipped with a vacuum apparatus. The pressure was gradually reduced while the temperature was raised to 285° C., and the polymerization was carried out for 210 minutes to thereby prepare a copolymerized polyester resin.

(2) Preparation of a Film 90 parts by weight of the copolymerized polyester resin prepared in step (1) and 10 parts by weight of a homopolyethylene terephthalate (HOMO-PET) resin (CTF41, manufacturer: SKC Co., Ltd.) (i.e., 10% by weight based on 100 parts by weight of the copolymerized polyester resin and the homopolyethylene terephthalate (HOMO-PET) resin in total) were mixed and extruded at 280° C. through a T-die, which was cooled to obtain an unstretched sheet.

Thereafter, the unstretched sheet was passed through a roll while it was conveyed at a speed of 55 m/min to thereby adjust the thickness thereof. The unstretched sheet was preheated at 105° C. for 0.1 minute while it was conveyed at a speed of 55 m/min and stretched 4.15 times in the transverse direction (TD) at 83° C. Thereafter, the stretched sheet was heat set at 75° C. for 0.1 minute to prepare a polyester film having a thickness of 40 μm.

Examples 1-2 to 1-9 and Comparative Examples 1-1 to 1-9

Polyester films were prepared in the same manner as in Example 1-1, except that the contents of the dicarboxylic acid and the diol, the content of the homopolyethylene terephthalate, and the process conditions were changed as shown in Table 1 below.

The final components of the polyester films prepared in Examples 1-1 to 1-9 and Comparative Examples 1-1 to 1-9 are shown in Table 2 below.

TABLE 1

|  | HOMO-PET (part by weight) | Stretching ratio | | Preheating temp. (° C.) | Heat-setting temp. (° C.) |
| --- | --- | --- | --- | --- | --- |
|  |  | TD | MD |  |  |
| Ex. 1-1 | 10 | 4.15 | — | 105 | 75 |
| Ex. 1-2 | 3 | 4.15 | — | 105 | 85 |
| Ex. 1-3 | 5 | 4.15 | — | 105 | 90 |
| Ex. 1-4 | 5 | 4.15 | — | 105 | 75 |
| Ex. 1-5 | 10 | 4.15 | — | 105 | 75 |
| Ex. 1-6 | 20 | 4.15 | — | 105 | 75 |
| Ex. 1-7 | 20 | 4.5 | — | 115 | 70 |
| Ex. 1-8 | 10 | 4.15 | — | 105 | 93 |
| Ex. 1-9 | 30 | 4.15 | — | 105 | 75 |
| C. Ex. 1-1 | — | 4.5 | — | 115 | 70 |
| C. Ex. 1-2 | — | 4.5 | — | 115 | 75 |
| C. Ex. 1-3 | — | 4.5 | — | 115 | 85 |
| C. Ex. 1-4 | — | 4.5 | — | 115 | 90 |
| C. Ex. 1-5 | 40 | 4.15 | — | 105 | 77 |
| C. Ex. 1-6 | 60 | 4.15 | — | 105 | 70 |
| C. Ex. 1-7 | 80 | 4.15 | — | 105 | 75 |
| C. Ex. 1-8 | — | 4.5 | — | 115 | 75 |
| C. Ex. 1-9 | — | 4.5 | — | 115 | 75 |

TABLE 2

|  | TPA (% by mole) | EG (% by mole) | NPG (% by mole) | CHDM (% by mole) | DEG (% by mole) |
| --- | --- | --- | --- | --- | --- |
| Ex. 1-1 | 100 | 78.0 | 17.0 | — | 5.0 |
| Ex. 1-2 | 100 | 78.0 | 17.0 | — | 5.0 |
| Ex. 1-3 | 100 | 78.2 | 16.9 | — | 4.9 |
| Ex. 1-4 | 100 | 79.9 | 15.9 | — | 4.2 |
| Ex. 1-5 | 100 | 80.4 | 15.4 | — | 4.2 |
| Ex. 1-6 | 100 | 82.1 | 13.9 | — | 4.0 |
| Ex. 1-7 | 100 | 72.0 | 24.0 | — | 4.0 |
| Ex. 1-8 | 100 | 80.0 | 16.0 | — | 4.0 |
| Ex. 1-9 | 100 | 80.0 | 16.0 | — | 4.0 |
| C. Ex. 1-1 | 100 | 71.0 | 24.0 | — | 5.0 |
| C. Ex. 1-2 | 100 | 71.0 | 24.0 | — | 5.0 |
| C. Ex. 1-3 | 100 | 71.0 | 24.0 | — | 5.0 |
| C. Ex. 1-4 | 100 | 71.0 | 24.0 | — | 5.0 |
| C. Ex. 1-5 | 100 | 86.3 | 10.0 | — | 3.7 |
| C. Ex. 1-6 | 100 | 90.6 | 6.3 | — | 3.1 |
| C. Ex. 1-7 | 100 | 94.5 | 3.4 | — | 2.1 |
| C. Ex. 1-8 | 100 | 66.4 | — | 23.0 | 10.6 |
| C. Ex. 1-9 | 100 | 66.6 | — | 23.1 | 10.3 |

*NPG: neopentyl glycol
*CHDM: 1.4-cyclohexanedimethanol
*DEG: diethylene glycol

Test Example 1-1: Melting Enthalpy (ΔHm)

4 mg of a sample of the polyester films prepared in Examples 1-1 to 1-9 and Comparative Examples 1-1 to 1-9 was scanned in a differential scanning calorimeter (DSC) mode at a temperature elevation rate of 10° C./min using a differential scanning calorimeter (Q2000, manufacturer: TA Instruments).

In the heat flow curve obtained by scanning, the first endothermic temperature was a glass transition temperature (Tg), the exothermic temperature measured after the glass transition temperature (Tg) was a crystallization temperature (Tc), and the endothermic temperature measured after the crystallization temperature (Tc) was a melting point (Tm). Here, the integral value at the melting point (Tm) was calculated as melting enthalpy. Specifically, melting enthalpy is energy in the section where endothermic occurs in the heat flow curve of the differential scanning calorimeter. The trend line from the melting start temperature to the melting completion temperature was set as a baseline, and the integral value of the peak along the baseline was converted and calculated.

FIG. 5 shows a differential scanning calorimetry (DSC) curve of the polyester film of Example 1-3.

Test Example 1-2: Melting Point (Tm)

4 mg of a sample of the polyester films prepared in Examples 1-1 to 1-9 and Comparative Examples 1-1 to 1-9 was scanned in a differential scanning calorimeter (DSC) mode at a temperature elevation rate of 10° C./min using a differential scanning calorimeter (Q2000, manufacturer: TA Instruments).

In the heat flow curve obtained by scanning, the first endothermic temperature was a glass transition temperature (Tg), the exothermic temperature measured after the glass transition temperature (Tg) was a crystallization temperature (Tc), and the endothermic temperature measured after the crystallization temperature (Tc) was a melting point (Tm) (see FIG. 5).

Test Example 1-3: Peel Strength

FIG. 3 shows a method of measuring the peel strength of a polyester film. That is, FIG. 3 shows a method of testing the seaming characteristics of a polyester film as adhesive strength by a solvent.

Specifically, first, two sample sheets (i.e., a first polyester film and a second polyester film) of the polyester films of Examples 1-1 to 1-9 and Comparative Examples 1-1 to 1-9 were each prepared in A4 size.

Thereafter, while 1,3-dioxolane was applied to one side of the first polyester film (100) in the form of a band having a width of 2 mm and a length of 30 mm to form an adhesive part (110), the second polyester film (200) was laminated on the first polyester film on which the adhesive part had been formed (see FIG. 3(a)). Here, the adhesive part (110) was formed at a position distanced by 6.5 cm (w) from the upper end of the first polyester film (100). In addition, the area of the adhesive part (110) was 60 mm².

Thereafter, in order to prevent the first polyester film and the second polyester film laminated from bending, a pressing plate (120) was placed on the second polyester film. Thereafter, a weight (130) of 2 kg was placed on the pressing plate (120) and aged for 1 hour (see FIG. 3(b)). Here, the weight (130) was placed at the position of the adhesive part (110).

Thereafter, the weight (130) and the pressing plate (120) were removed, and the first polyester film and the second polyester film laminated were cut into a width of 3 cm and a length of 9 cm to obtain Sample A (300) (see FIG. 3(c)).

Thereafter, when the first polyester film (100) and the second polyester film (200) in the sample (300) were delaminated at a speed of 300 mm/min and an angle of 180°, the maximum force was measured as peel strength (see FIG. 3(d)).

The test described above was carried out 5 times, and the average value is shown in Table 3 below.

Test Example 1-4: Heat Shrinkage Rate

FIG. 4 shows a method of measuring the heat shrinkage of a polyester film. Referring to FIG. 4, the polyester films (100) prepared in Examples 1-1 to 1-9 and Comparative Examples 1-1 to 1-9 were each cut to 300 mm in the direction to be measured and 15 mm in the direction perpendicular thereto. Here, 300 mm was the first dimension (x1) before shrinkage, and 15 mm was the second dimension (y) (see FIG. 4(a)).

The cut polyester film (100) was immersed in a water bath heated, and the shrunk dimension of the polyester film (100a) after shrinkage, that is, the first dimension after shrinkage (x2) was measured (see FIG. 4(b)) and calculated according to the following Equation 2. The heat shrinkage rate (%) in this test example was obtained in the main shrinkage direction (TD) and a direction (MD) perpendicular thereto of the film.

$$\text{Heat shrinkage rate} = \frac{(x1 - x2)}{x1} \times 100 \qquad \text{[Equation 2]}$$

TABLE 3

|  | ΔHm (J/g) | Tm (° C.) | Peel strength (gf/3 cm) |
| --- | --- | --- | --- |
| Ex. 1-1 | 25.9 | 202.8 | 600 |
| Ex. 1-2 | 23.0 | 208.2 | 400 |
| Ex. 1-3 | 25.9 | 200.8 | 345 |
| Ex. 1-4 | 25.1 | 211.8 | 659 |
| Ex. 1-5 | 25.3 | 220.0 | 489 |
| Ex. 1-6 | 23.5 | 199.5 | 361 |
| Ex. 1-7 | 16.9 | 223.9 | 1,010 |
| Ex. 1-8 | 19.9 | 229.0 | 412 |
| Ex. 1-9 | 15.0 | 185.1 | 350 |
| C. Ex. 1-1 | 16.5 | 188.7 | 2,208 |
| C. Ex. 1-2 | 18.4 | 188.9 | 2,012 |
| C. Ex. 1-3 | 15.6 | 184.6 | 1,357 |
| C. Ex. 1-4 | 17.3 | 233.7 | 870 |
| C. Ex. 1-5 | 33.6 | 240.7 | 120 |
| C. Ex. 1-6 | 39.5 | 247.1 | 80 |
| C. Ex. 1-7 | 44.6 | 161.4 | 50 |
| C. Ex. 1-8 | 7.9 | 160.4 | 2,514 |
| C. Ex. 1-9 | 10.3 | 202.8 | 2,317 |

TABLE 4

|  | TD thermal shrinkage rate (%) | | | | MD thermal shrinkage rate (%) | | | | |
| --- | --- | --- | --- | --- | --- | --- | --- | --- | --- |
|  | 70° C. | 80° C. | 90° C. | 100° C. | 70° C. | 75° C. | 80° C. | 90° C. | 100° C. |
| Ex. 1-1 | 25.0 | 58.0 | 70.0 | 73.0 | −1.0 | −0.5 | 0.0 | 1.8 | 2.8 |
| Ex. 1-2 | 10.0 | 46.0 | 60.0 | 66.0 | 0.0 | −2.2 | −0.6 | 0.9 | 2.4 |
| Ex. 1-3 | 4.0 | 25.0 | 42.0 | 51.0 | 0.0 | −1.1 | −1.7 | 1.2 | 2.3 |
| Ex. 1-4 | 26.7 | 67.3 | 75.3 | 76.3 | 2.2 | −2.2 | −1.7 | 2.8 | 3.3 |
| Ex. 1-5 | 23.7 | 67.0 | 72.3 | 74.0 | 2.2 | −2.2 | −2.8 | 0.0 | 0.6 |
| Ex. 1-6 | 26.0 | 63.3 | 73.7 | 75.0 | 3.3 | 0.6 | 0.0 | 4.4 | 5.6 |

TABLE 4-continued

|  | TD thermal shrinkage rate (%) | | | | MD thermal shrinkage rate (%) | | | | |
| --- | --- | --- | --- | --- | --- | --- | --- | --- | --- |
|  | 70° C. | 80° C. | 90° C. | 100° C. | 70° C. | 75° C. | 80° C. | 90° C. | 100° C. |
| Ex. 1-7 | 45.0 | 75.0 | 78.0 | 78.0 | −1.2 | −4.2 | −2.1 | 3.4 | 5.8 |
| Ex. 1-8 | 0.6 | 57.2 | 72.2 | 76.1 | −0.8 | 1.2 | 0.0 | 2.8 | 4.8 |
| Ex. 1-9 | 25.0 | 51.0 | 68.3 | 72.0 | 0 | −2.3 | −1.3 | 0.7 | 2.3 |
| C. Ex. 1-1 | 51.0 | 78.0 | 79.7 | 80.0 | −6.7 | −5.0 | 0.0 | 2.3 | 2.7 |
| C. Ex. 1-2 | 33.0 | 73.0 | 79.3 | 80.0 | −5.3 | −8.6 | −4.0 | 1.0 | 1.7 |
| C. Ex. 1-3 | 5.3 | 52.7 | 74.3 | 78.7 | −0.7 | −3.3 | −4.0 | −2.0 | 1.7 |
| C. Ex. 1-4 | 2.7 | 26.7 | 56.3 | 67.3 | −0.7 | −1.7 | −4.0 | −6.0 | −4.7 |
| C. Ex. 1-5 | 14.0 | 53.0 | 66.3 | 68.3 | 5.6 | 8.3 | 5.0 | 3.9 | 7.2 |
| C. Ex. 1-6 | 9.3 | 37.0 | 53.7 | 55.0 | 5.8 | 7.2 | 6.3 | 4.4 | 7.6 |
| C. Ex. 1-7 | 5.0 | 19.0 | 37.3 | 41.0 | 6.2 | 8.5 | 7.2 | 6.1 | 8.0 |
| C. Ex. 1-8 | 37.0 | 73.3 | 79.7 | 79.7 | −5.8 | −4.7 | −1.7 | 0.7 | 2.7 |
| C. Ex. 1-9 | 28.3 | 63.3 | 69.3 | 78.3 | −1.0 | −4.3 | −3.7 | −2.0 | 1.0 |

As shown in Tables 3 and 4, in the polyester films of Examples 1-1 to 1-9, the melting enthalpy, melting point, peel strength, and heat shrinkage rate with respect to temperature fell within the preferred ranges.

Specifically, since the polyester films of Examples 1-1 to 1-9 satisfy the preferred range of adhesive strength after the seaming process, they are suitable for application as a heat shrinkable film. In addition, since the melting enthalpy, melting point, and peel strength of the polyester films of Examples 1-1 to 1-9 are adjusted to the above range, the clumping ratio is very low in the regeneration process of the film or a polyethylene terephthalate (PET) container comprising the film. Thus, it is possible to prevent environmental pollution while the recyclability is enhanced.

Preparation of Regenerated Polyester Chips

Example 2-1

(1) Preparation of a Polyethylene Terephthalate Container Provided with a Polyester Film FIG. 1 shows a polyester film applied to a product before and after heat shrinkage thereof. Referring to FIG. 1, a part of the outer surface of a polyethylene terephthalate container (PET container, 30 g) was wrapped with the polyester film prepared in Example 1-1 (see FIG. 1(a)). In such event, it was fixed using an acrylic adhesive. Thereafter, the polyester film of Example 1-1 was shrunk at a temperature of 90° C. under a hot air condition to obtain a polyethylene terephthalate container provided with a polyester film (see FIG. 1(b)).

(2) Regeneration Process of a Polyethylene Terephthalate Container

The container provided with a polyester film prepared in step (1) was crushed with a crusher to obtain flakes. The flakes were first washed with water. Thereafter, the flakes were second washed for 15 minutes with a washing solution (a mixture of a solution of 0.3% by weight of Triton X-100 and a solution of 1.0% by weight of NaOH) stirred in a bath at 88° C. and 880 rpm. Thereafter, the second washed flakes were third washed with water at room temperature to remove the residual washing solution and dried at 160° C. for 20 minutes. Thereafter, they were thermally treated at 210° C. for 90 minutes to produce regenerated polyester chips.

Examples 2-2 to 2-9 and Comparative Examples 2-1 to 2-9

Regenerated polyester chips were prepared in the same manner as in Example 2-1, except that the polyester films of Examples 1-2 to 1-9 and Comparative Examples 1-1 to 1-9 were each used instead of the polyester film of Example 1-1.

Test Example 2-1: Clumping Ratio

The clumping ratio (%) was measured according to the procedure for polyethylene terephthalate flake clumping evaluation (APR PET-S-08) of the U.S. Association of Plastic Recyclers (APR).

FIG. 2 shows a method of measuring the clumping of a polyethylene terephthalate (PET) container provided with a polyester film.

Specifically, a product (1) in which a polyester film is provided as a label (11a) in a polyethylene terephthalate (PET) container (20) was crushed in a crusher (6) and passed through a sieve (0.374" sieve, not shown) having a hole size is 9.5 mm to obtain mixed flakes composed of 97 g of first flakes (20a) obtained by crushing polyethylene terephthalate (PET) and 3 g of second flakes (10a) obtained by crushing a polyester film. In such event, the polyester containers of Examples 2-1 to 2-9 and Comparative Examples 2-1 to 2-9 prepared above were used as the product (1) (see FIGS. 1 and 2(a)).

Thereafter, the mixed flakes were placed on a cylinder having a diameter of 6 cm and a height of 8 cm, and a compressing weight (7) of 8.7 kg was placed thereon to apply a load. Thereafter, the cylinder with the weight thereon was thermally treated in a convection oven at 210° C. for 90 minutes and then cooled at room temperature (see FIG. 2(b)).

Thereafter, the cooled mixed flakes were placed on a second sieve (8; 0.625" sieve) with a hole diameter (d) of 11.2 mm and filtered, and the aggregated mixed flakes (10b) remaining on the second sieve (8) were collected and weighed (see FIG. 2(c)). The weight of the mixed flakes was measured and calculated according to the following Equation 1.

$$\text{Clumping ratio (\%)} = \frac{\text{Weight of aggregated mixed flakes}}{\text{Weight of mixed flakes before thermal treatment}} \times 100 \quad \text{[Equation 1]}$$

TABLE 5

| | Clumping ratio (%) |
|---|---|
| Ex. 2-1 | 3.8 |
| Ex. 2-2 | 6.2 |
| Ex. 2-3 | 5.5 |
| Ex. 2-4 | 0.0 |
| Ex. 2-5 | 0.0 |
| Ex. 2-6 | 0.0 |
| Ex. 2-7 | 0.0 |
| Ex. 2-8 | 0.0 |
| Ex. 2-9 | 0.0 |
| C. Ex. 2-1 | 11.7 |
| C. Ex. 2-2 | 16.1 |
| C. Ex. 2-3 | 22.7 |
| C. Ex. 2-4 | 14.5 |
| C. Ex. 2-5 | 0.0 |
| C. Ex. 2-6 | 0.0 |
| C. Ex. 2-7 | 0.0 |
| C. Ex. 2-8 | 21.3 |
| C. Ex. 2-9 | 18.6 |

As shown in Table 5, since the regenerated polyester chips of Examples 2-1 to 2-9 had a very low clumping ratio, it is advantageous for the regeneration process at high temperatures for a long period of time, thereby enhancing the recyclability.

Specifically, as shown in Table 3, since a polyester film satisfying the specific ranges of melting enthalpy, melting point, and peel strength and having excellent mechanical properties was used, in particular, a polyester film containing a homopolyethylene terephthalate (HOMO-PET) resin in a specific content was used, the regenerated polyester chips of Example 2-1 to 2-9 had a low clumping ratio.

In contrast, the regenerated polyester chips of Comparative Examples 2-1 to 2-4, 2-8, and 2-9 had a very high clumping ratio, thereby deteriorating the recyclability. Meanwhile, although the regenerated polyester chips of Comparative Examples 2-5 to 2-7 had a low clumping ratio, the thermal properties and seaming characteristics of the polyester films were poor as shown in Table 3, whereby it is difficult to be applied to various products.

The invention claimed is:

1. A polyester film comprising:
   a copolymerized polyester resin in which a diol and a dicarboxylic acid are copolymerized; and
   a homopolyethylene terephthalate (HOMO-PET) resin,
   wherein the diol comprises ethylene glycol, neopentyl glycol and 1% by mole to 8% by mole of diethylene glycol,
   wherein the dicarboxylic acid comprises terephthalic acid,
   wherein the polyester film comprises the HOMO-PET resin in an amount of 0.5% by weight to 25% by weight based on a total weight of the copolymerized polyester resin and the HOMO-PET resin,
   wherein a melting point (Tm) is 190° C. to 230° C. as measured by differential scanning calorimetry, a clumping ratio is 10% or less, and a peel strength is 150 gf/3 cm or more.

2. The polyester film of claim 1, which has a heat shrinkage rate of 45% to 85% in a first direction upon thermal treatment at a temperature of 100° C. for 10 seconds.

3. The polyester film of claim 1, which has a heat shrinkage rate of 7% or less in a second direction perpendicular to a first direction upon thermal treatment at a temperature of 100° C. for 10 seconds.

4. The polyester film of claim 1, wherein the diol comprises ethylene glycol and at least one comonomer selected from the group consisting of neopentyl glycol and diethylene glycol in an amount of 10% by mole or more.

5. The polyester film of claim 1, wherein the neopentyl glycol is in an amount of 5% by mole to 35% by mole of the total diol.

6. A process for preparing a polyester film, which comprises:
   preparing a copolymerized polyester resin in which a diol and a dicarboxylic acid are copolymerized;
   adding a homopolyethylene terephthalate (HOMO-PET) resin to the copolymerized polyester resin and then melt-extruding the resins at a temperature of 250° C. to 300° C. to prepare an unstretched sheet; and
   stretching the unstretched sheet and then heat-setting the stretched sheet at a temperature of 70° C. to 100° C. to prepare a polyester film,
   wherein the diol comprises ethylene glycol, neopentyl glycol and 1% by mole to 8% by mole of diethylene glycol,
   wherein the dicarboxylic acid comprises terephthalic acid,
   wherein the polyester film comprises the HOMO-PET resin in an amount of 0.5% by weight to 25% by weight of based on a total weight of the copolymerized polyester resin and the HOMO-PET resin,
   wherein the polyester film has a melting point (Tm) of 190° C. to 230° C. as measured by differential scanning calorimetry, a clumping ratio of 10% or less, and a peel strength of 150 gf/3 cm or more.

7. A process for regenerating a polyethylene terephthalate container, which comprises:
   providing a polyethylene terephthalate container provided with the polyester film of claim 1;
   crushing the polyethylene terephthalate container provided with the polyester film to obtain flakes; and
   thermally treating the flakes to produce regenerated polyester chips,
   wherein a clumping ratio of the flakes is 10% or less, and the flakes comprise first flakes obtained by crushing the polyethylene terephthalate (PET) container and second flakes obtained by crushing the polyester film.

* * * * *